3,559,016
PERMANENT SPLIT CAPACITOR MOTOR HAVING
STARTING CURRENT CONTROL
Karl M. Gerteis, Cazenovia, N.Y., assignor to Carrier
 Corporation, Syracuse, N.Y., a corporation of Delaware
Continuation of application Ser. No. 686,653, Nov. 29,
 1967. This application July 17, 1969, Ser. No. 849,232
Int. Cl. H02p 1/44
U.S. Cl. 318—221                                          4 Claims

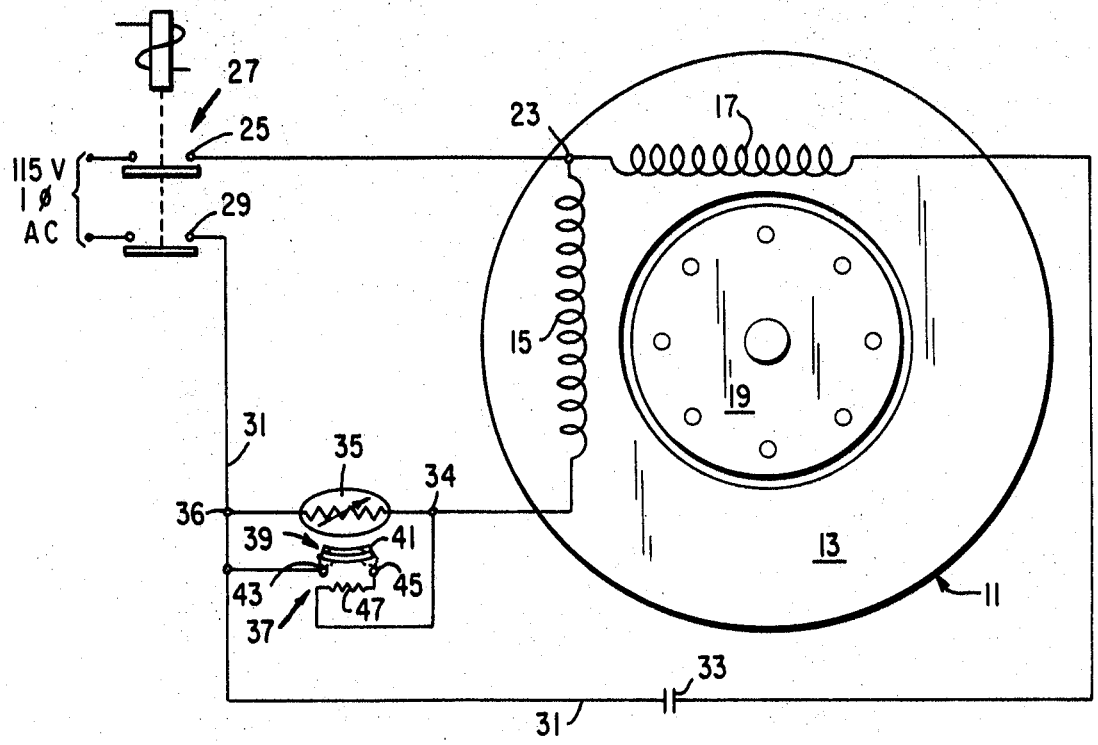

ABSTRACT OF THE DISCLOSURE

A permanent split capacitor motor is provided with a circuit having a capacitor to the auxiliary winding. The circuit to the main winding includes a current limiting negative thermistor and bypass means for the thermistor. The bypass means includes a bimetal switch which is quickly closed when subject to the thermistor heat which results as the motor approaches full starting speed. A small resistance in series with the bimetal switch keeps the switch closed.

This application is a continuation of Ser. No. 686,653, filed Nov. 29, 1967, now abandoned.

BACKGROUND OF THE INVENTION

The permanent split capacitor electric motor is now widely used in hermetic motor compressors employed in refrigeration systems in air conditioning applications. The starting torque of such a motor is very limited due to the small value of the capacitor which has been sized for optimum running performance. In spite of the marginal excess torque available for starting the compressor motor, there has been some commercial use of reduced voltage starters to reduce the starting inrush current to the entire motor. This use has not been entirely satisfactory.

SUMMARY OF THE INVENTION

A permanent split capacitor motor has a circuit including a current limiting negative thermistor to the main winding. Another circuit having a high capacitance, leads to the auxiliary winding. A thermistor by-pass is provided which is operated by thermistor heat, functions to bypass the thermistor during the starting period.

DESCRIPTION OF THE DRAWING

The single figure of the drawing shows a permanent split capacitor motor which has a thermistor in the circuit to the run winding and a by-pass for the thermistor which is operated by heat.

DESCRIPTION OF THE PREFERRED EMBODIMENT OF THE INVENTION

Referring to the single figure of the drawing, there is illustrated a permanent split capacitor induction motor 11 and a starting and running circuit embodying the features of the present invention. The motor 11 is of the permanent split capacitor type including a stator 13 provided with angularly displaced main and auxiliary windings 15 and 17, and a rotor 19. Preferably the windings are arranged in quadrature relation, the auxiliary winding 17 having starting and running impedances which are substantially larger than the respective starting and running impedance of the main winding 15.

One terminal of the auxiliary winding 17 is connected to one terminal of the main winding 15 to give a common junction 23. This junction is connected to terminal 25 of the solenoid starter switch 27. From the other terminal 29 of the starter switch, there is a condutcor 31 to one side of capacitor 33. The other side of the capacitor connects to the other terminal of the auxiliary winding 17.

The capacitor 33 is interposed in the auxiliary winding circuit in order to provide the phase displacement which produces the starting torque.

The other terminal of the main winding 15 is connected to a terminal 34 of a negative thermistor 35 whose resistance decreases from an initial high value to a low value. The other terminal 36 of the thermistor 35 connects to conductor 31. Below the thermistor a by-pass circuit 37 is provided and extends from conductor 31 to the right terminal 34 of the thermistor. The by-pass circuit includes a bi-metal switch 39 which is normally open and adjacent the thermistor. The bi-metal, snap-acting element 41 when heated sufficiently engages two contacts 43 and 45. Contact 43 connects to conductor 31 while contact 45 connects through a heating resistance 47 to terminal 34 of the thermistor.

In operation, the above arrangment is such that at start-up the voltage applied to the main winding 15 is reduced but the full voltage is applied to the auxiliary winding 17 and capacitor 33. Thus, when the starter switch 27 is closed, the motor is energized. Current to the main or run winding 15 passes through the negative thermistor 35 (75 percent of full voltage, for example) while full voltage is available across the run capacitor 33 and the auxiliary winding 17 in series. As the thermistor 35 is heated by the current flow, its resistance drops from an initial high value to a low value. The bi-metal switch 39 which is located adjacent to the thermistor 35 is heated by the thermistor and after a few seconds closes to complete a circuit by-passing thermistor 35. The bi-metal switch 39 remains closed during the running period due to the heat from the small resistor 47 in series with the bi-metal switch 39. Thus, under a run condition, the motor 11 operates with full voltage to both the run main winding and the run auxiliary winding combination. Since full voltage is applied to the auxiliary winding 17, the starting torque is substantially improved during the reduced voltage period for the main winding 15 when compared to the prior completely reduced current starting arrangement. This increased starting torque is produced without an appreciable change in line current because (a) the low level of the current through the auxiliary winding circuit and (b) the substantial phase angle between the currents in the main and auxiliary windings. The first has a lagging power factor and the second a leading one.

The advantage of the present invention can be realized when it is considered that, when a resistor is used to reduce the current to the whole motor during the inrush period, the starting torque of the motor varies as the square of the motor current. However, if the current is reduced in only the main winding, the reduction of starting torque approaches a linear relationship with the reduction in the motor line current. This results because the locked rotor torque is proportional to the product of the main and auxiliary winding ampere turns and the sine of the angle representing the phase displacement between these two currents.

While a preferred embodiment of the invention has been described, it should be understood that the invention is not limited thereto but may be otherwise embodied within the scope of the following claims.

I claim:
1. In combination, a permanent split capacitor electric motor having a rotor and a stator with angularly displaced main and auxiliary windings, one terminal of said main winding being connected to one terminal of said auxiliary winding to form a common junction connectible to one line of a source of single phase alternating current, the other terminal of said auxiliary winding being connectible through a capacitor to the other line of said source of current, voltage limiting means, the other terminal of said main winding being connectible to the other line of said current source through said voltage limiting means, said voltage limiting means being effective to limit current flow only during the starting period whereby full voltage passes only to the auxiliary winding for starting.

2. The combination according to claim 1 and being further characterized by:

said voltage limiting means including a negative thermistor and a normally-open by-pass which is closed in response to the heat condition of said thermistor at the running speed.

3. The combination according to claim 2 and being further characterized by:

said normally-open by-pass being a by-pass circuit having a normally-open bimetal switch subject to the heat of said thermistor and then to a heating resistance in series with said switch.

4. In combination, a permanent split capacitor electric motor having a rotor and a stator with angularly displaced main and auxiliary windings, a starter switch having two terminals for connection to a single phase alternating current source, a capacitor connected in series between one terminal of said auxiliary winding and one terminal of said starter switch, one terminal of said main winding being connected to the other terminal of said auxiliary winding to form a common terminal, said common terminal being connected to the other terminal of said starter switch, the other terminal of said main winding being connected to a terminal of a thermistor which has its resistance drop from a high value to a low value by current flow, the other terminal of said thermistor being connected to the first-mentioned terminal of said starter switch, a parallel circuit to said thermistor, said parallel circuit including a normally-open bimetal switch and a series resistance which holds the bimetal switch closed during running conditions, said thermistor being so located as to be capable of closing said bimetal switch after a suitable start-up has been realized whereby the main winding temporarily does not receive full voltage while the auxiliary winding receives full voltage for starting.

References Cited

UNITED STATES PATENTS

| | | | |
|---|---|---|---|
| 1,847,888 | 3/1932 | Nickle | 318—229X |
| 2,120,321 | 6/1938 | Bargdill | 318—228X |
| 2,261,250 | 11/1941 | Haddad | 318—229X |
| 3,303,402 | 2/1967 | Martin | 318—229X |

FOREIGN PATENTS

| | | | |
|---|---|---|---|
| 1,042,126 | 9/1966 | Great Britain | 318—221 |

ORIS L. RADER, Primary Examiner

G. Z. RUBINSON, Assistant Examiner

U.S. Cl. X.R.

317—13, 41; 318—229